(12) United States Patent
Clark et al.

(10) Patent No.: US 10,275,821 B2
(45) Date of Patent: Apr. 30, 2019

(54) SMART SHOPPING CART AND METHOD OF USE

(71) Applicant: Walmart Apollo, LLC, Bentonville, AR (US)

(72) Inventors: Jimmie R. Clark, Fayetteville, AR (US); Richard Andrew White, Pineville, MO (US); Christopher Soames Johnson, Pea Ridge, AR (US)

(73) Assignee: WALMART APOLLO, LLC, Bentonville, AR (US)

( * ) Notice: Subject to any disclaimer, the term of this patent is extended or adjusted under 35 U.S.C. 154(b) by 329 days.

(21) Appl. No.: 15/372,528

(22) Filed: Dec. 8, 2016

(65) Prior Publication Data

US 2017/0186072 A1    Jun. 29, 2017

Related U.S. Application Data

(60) Provisional application No. 62/387,543, filed on Dec. 24, 2015.

(51) Int. Cl.
| | |
|---|---|
| *G06Q 30/00* | (2012.01) |
| *G06K 15/00* | (2006.01) |
| *H04W 88/02* | (2009.01) |
| *B62B 3/14* | (2006.01) |
| *G06Q 30/06* | (2012.01) |

(52) U.S. Cl.
CPC ................... *G06Q 30/0633* (2013.01)

(58) Field of Classification Search
CPC ..................................................... G06Q 30/00
See application file for complete search history.

(56) References Cited

U.S. PATENT DOCUMENTS

| | | | | |
|---|---|---|---|---|
| 5,729,697 | A * | 3/1998 | Schkolnick | G06Q 20/203 235/383 |
| 6,032,127 | A * | 2/2000 | Schkolnick | G06Q 20/203 705/22 |
| 7,780,081 | B1 | 8/2010 | Liang | |
| 7,839,276 | B2 * | 11/2010 | Rodgers | G06F 21/606 340/501 |
| 10,032,197 | B2 * | 7/2018 | Soldate | G06Q 30/06 |
| 10,073,996 | B2 * | 9/2018 | Ferrer Alos | G07G 1/0081 |
| 2002/0170961 | A1 | 11/2002 | Dickson et al. | |
| 2005/0024290 | A1 * | 2/2005 | Aisenbrey | B29C 45/0013 343/873 |
| 2008/0258877 | A1 * | 10/2008 | Rodgers | G06F 21/606 340/10.3 |
| 2009/0256680 | A1 * | 10/2009 | Kilian | G06K 7/0008 340/10.1 |

(Continued)

OTHER PUBLICATIONS

Mobile Mounting Solutions, "Shopping Cart Phone Mount and Shopping Apps", Proclip, dated Jun. 22, 2016. (Year: 2016).*

(Continued)

*Primary Examiner* — Mark A Fadok
(74) *Attorney, Agent, or Firm* — Schmeiser, Olsen & Watts LLP

(57) ABSTRACT

Disclosed is a smart shopping cart and a method of using a smart shopping cart. The smart shopping cart may hold a set of containers that the customer can place their items in as they are shopping. The customer will associate their mobile device with the physical cart as an electronic shopping cart.

18 Claims, 3 Drawing Sheets

(56) References Cited

U.S. PATENT DOCUMENTS

| | | | |
|---|---|---|---|
| 2010/0136918 A1* | 6/2010 | Bonner | H04W 4/02 455/66.1 |
| 2011/0025498 A1* | 2/2011 | Dinh | G08B 13/2471 340/540 |
| 2011/0106624 A1* | 5/2011 | Bonner | G06Q 30/0261 705/14.58 |
| 2012/0284132 A1* | 11/2012 | Kim | G07G 1/0081 705/20 |
| 2013/0103539 A1 | 4/2013 | Abraham et al. | |
| 2014/0164176 A1* | 6/2014 | Kitlyar | G06Q 30/0633 705/26.8 |
| 2015/0088642 A1* | 3/2015 | Mathew | G06Q 30/0633 705/14.51 |
| 2015/0162957 A1* | 6/2015 | Saghbini | H04B 5/0062 455/41.1 |
| 2015/0206121 A1 | 7/2015 | Joseph et al. | |
| 2016/0039442 A1* | 2/2016 | Tilburger | G07F 7/0672 280/33.992 |
| 2016/0180670 A1* | 6/2016 | Swope | G08B 13/246 340/568.5 |
| 2017/0300980 A1* | 10/2017 | Soldate | G06Q 30/06 |

OTHER PUBLICATIONS

Östman, Hanna, "Grocery industry operations are facing a real paradigm shift," RFIDArena.com, Apr. 11, 2013, 9 pages.

Brian Lui, "Intorduction—Smart Shopping Cart & Intelligent Assistant," YouTube.com, Jan. 24, 2024.

Bhargav Sridhar, "Kart-Redefining Shopping Experience," YouTube.com, Aug. 11, 2013.

Kumar, et al, "Intelligent Shopping Cart," International Journal of Engineering Science and Innovative Technology, Jul. 2013, pp. 499-507, vol. 2, Issue 4.

\* cited by examiner

SMART SHOPPING CART AND METHOD OF USE

RELATED APPLICATIONS

This application claims priority to U.S. Provisional Application Ser. No. 62/387,543, filed on Dec. 24, 2015 entitled "Smart Shopping Cart and Method of Use", the entirety of which is incorporated by reference herein.

FIELD OF THE INVENTION

The invention relates generally to a smart shopping cart and a method of using a smart shopping cart.

BACKGROUND

When shopping in a store or club and the customer is using an electronic shopping application (app) and checking out on their mobile device, it is still necessary for the customer to package up their purchases into some sort of container when taking them home. Many times this requires the customer to touch the item three times—once to add to their cart, once to bag it, and once to put it away at home.

If the customer does use their own bagging system, conventional carts in use in stores and clubs are not geared toward bagging in their cart. If the customer is bagging in their own container, they can make mistakes on what is in their cart and what is added to their electronic cart.

Accordingly, it is desirable to provide a smart shopping cart to improve the accuracy of a customer's completed checkout, i.e. to prevent the customer for paying for items that they did not purchase. In addition, it is desirable to have a smart shopping cart to prevent product loss due to theft.

BRIEF SUMMARY

Disclosed is a smart shopping cart comprising a mobile device holder; a removable container; an RFID reader, wherein the RFID reader detects items being added or removed from the smart shopping cart; and a link to an electronic cart on a customer mobile device, wherein the electronic cart is updated as the items are being added or removed from the smart shopping cart and wherein the smart shopping cart is shielded with conductive material.

In another aspect, disclosed is a method of using a smart shopping cart comprising placing an item within an input zone of the smart shopping cart, wherein the smart shopping cart comprises a mobile device holder and an RFID and wherein the cart is shielded with conductive material; scanning the item in the input zone with a mobile device having an electronic cart or the RFID reader in communication with the mobile device; placing the item in a removable container in the smart shopping cart, wherein the item is protected from outside RF inspection; paying for the item in the electronic cart; and removing the removable container from the smart shopping cart.

BRIEF DESCRIPTION OF THE SEVERAL VIEWS OF THE DRAWINGS

The above and further advantages of this invention may be better understood by referring to the following description in conjunction with the accompanying drawings, in which like numerals indicate like structural elements and features in various figures. The drawings are not necessarily to scale, emphasis instead being placed upon illustrating the principles of the invention.

DETAILED DESCRIPTION

Figure 1A:
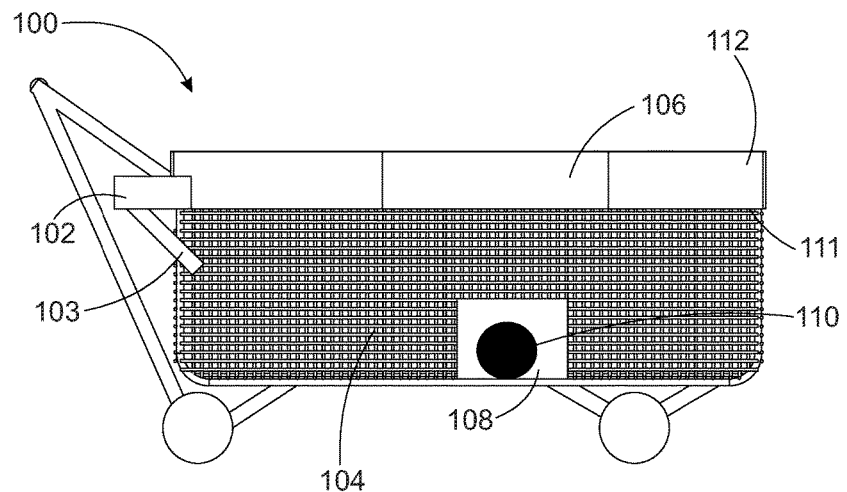
FIG. 1A is an illustrative side view of a smart shopping cart according to the invention.

Disclosed herein is a smart shopping cart and a method of using a smart shopping cart.

A physical smart shopping cart with the capability/structure to hold a set of containers, including, but not limited to, plastic tubs and reusable shopping bags, that the customer can place their items in as they are shopping, is disclosed. The cart will also have a built in radio frequency identification (RFID) reader proximate a handle end of a top portion of the smart shopping cart.

The customer will use their mobile device as their electronic shopping cart. The mobile device is associated to the smart shopping cart that the customer chooses and serves as an RFID reader. In an alternate embodiment, the mobile device may be associated with a physical RFID reader on the smart shopping cart. Mobile computing devices such as tablets and cell phones are often used by customers as they move about a store.

As items are added to the cart, the RFID reader will capture each item's information from the item's RFID chip to automatically add it to the customer's electronic shopping cart on their mobile device. The shopping application on the customer's mobile device will notify the customer of what was added to the cart.

When the customer removes an item from their smart shopping cart, the RFID reader will detect that the item has been removed from the smart shopping cart and will automatically remove it from the customer's electronic cart. The application on the customer's mobile device will notify the customer of what was removed from the smart shopping cart. The app on the customer's phone will give them information about the status of their smart shopping cart including what is in their physical/smart shopping cart and is also in their electronic cart; what is in their physical/smart shopping cart and is not in their electronic cart; and what is in their electronic cart and is not in their physical/smart shopping cart.

When a customer is done shopping and checks out, their items are already packaged in the removable container(s) and ready to load in their vehicle. A customer's completed checkout is more accurate, preventing loss and paying for items they did not get.

The smart shopping cart as described herein is shielded with a conductive material, i.e. a Faraday shield. The smart shopping cart is constructed of a material that embodies properties required to protect the contents of the smart shopping cart from RF waves outside of the smart shopping cart. The cart may be constructed of a polymer or plastic like material impregnated with metal "wire" in a grid pattern, wherein the grid pattern is small enough to protect the reusable containers and item or items from outside RF fields.

The smart shopping cart according to the invention is constructed to conform to requirements needed to protect the contents from being scanned by others, to contain the RF field used by the shopper and prevent unintended product scanning, acting as a Faraday shield. A Faraday shield is an enclosure formed by conductive material or by a mesh of such material, used to block electric fields. The smart shopping cart according to the invention incorporates the features of a Faraday shield protecting the contents of the cart from outside radio wave interference. Conventional plastic carts are not conductive and fail as an RF shield. Further, the inconsistent hole size in conventional metal framed carts also results in failure as an RF shield. However, conventional plastic and/or metal-framed carts may be retrofitted with a "mesh" type lining.

RFID's generally operate at about 455 MHz, about 2.45 GHz, or about 5.8 GHz, and typically have a read range of about 60 feet to about 300 feet (about 20 meters to about 100 meters). Openings in the smart shopping cart are small with respect to the wavelength of the incident radio wave. For example, about a 1 GHz wave has a wavelength of about 0.3 meters in free space. As long as the openings are about equal to, or less than that dimension, the openings will not permit the incident wave in the smart shopping cart, such as for about 2.4 GHz, grid openings of about 6.25 mm (about ¼") grid (openings) would maintain the shielding effect Generally, wavelength as used herein is defined as the speed of light in meters per second divided by frequency in Hz. Therefore, the wavelength is the minimum size in meters for the openings in the Faraday shield. The magnitude varies based on opening shape. However, mesh with wires aligned orthogonally in both directions will shield better by about a factor of 2. In addition, any radio wave technology that can be contained within a Faraday shield, such as NFC (near field communication), may be used.

The conductive material must meet the minimal shielding requirements for the RF technology employed. The conductivity of most metal allows the carriers to easily realign to cancel external fields. For example, if silver is used, a mesh thickness at about 200 MHz is reduced to about 4.5 microns. For conductive materials with less conductive properties, mesh would need to be thicker.

The mobile device cradle (holder) according to the invention includes the ability to hold a conventional mobile device and focus the mobile device RF signal into the cart input zone. The top portion of the cradle is open to insert the mobile device. The sides of the cradle are shielded with a conductive material and the bottom of the cradle may be open or constructed of a non-conductive material.

The mobile device cradle may further include an angled reflective surface comprising a material that will deflect the RF signal from the mobile device within the cradle, such as polished or chromed metal. The deflected signal should not be able to reach any item within the smart shopping cart. The reflective surface prevents RF waves from leaving a predefined space at or above the surface of the smart shopping cart that does not extend beyond the smart shopping cart upper edges. The desired effect is to deflect the RF signal in such a way as to keep the RF field from entering the customer's smart shopping cart so as to prevent scanning an item multiple times and/or scanning an item that is not going into the customer's smart shopping cart.

The smart shopping cart as described herein includes an input or scanning zone. The input zone is accessible only by the instant customer. The customer places an item to be purchased within the input zone. The item is placed into removable/reusable container or set of containers in the smart shopping cart. In this manner, the item placed into the removable/reusable container is protected from outside RF inspection. The item is then paid for with the customer's mobile device. As the top portion of the shielded smart shopping cart is open there is some incident wave from above the cart, reflective shields to contain the input (scanning) zone may be used.

Figure 1B:
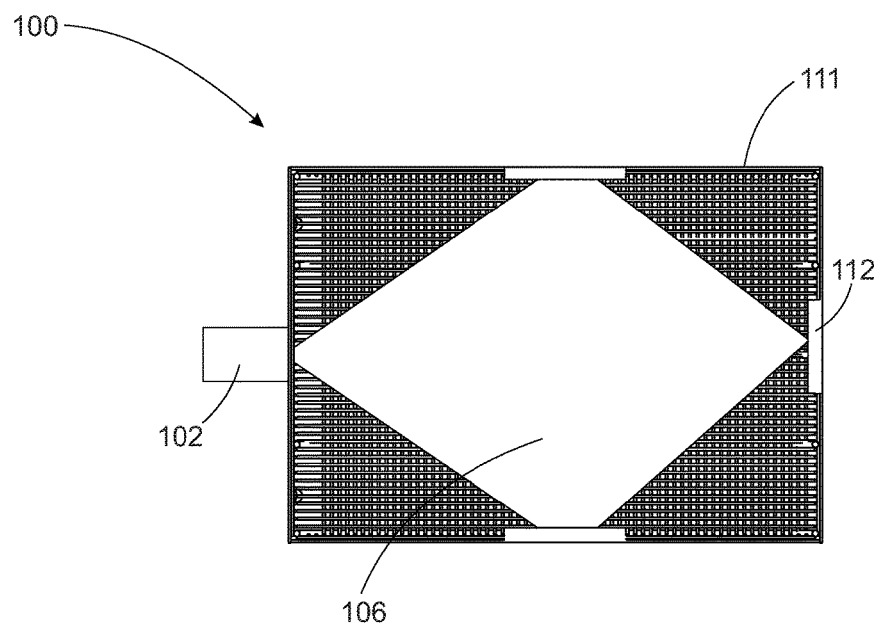
FIG. 1B is an illustrative overhead view of a smart shopping cart according to the invention

In FIGS. 1A and 1B, upper portion of smart shopping cart 100 is open to allow for product to enter. Smart shopping cart 100 includes cradle 102. Cradle 102 includes a reflective surface 103 angled away from cradle 102. Reflective surface 103 deflects the RF signal in a way as to keep the RF field from entering cart 100 after scanning in scanning zone 106.

The lower product 110 is in cart 100, the more protected it is from outside detection. Product 110 is placed in container 108. Optionally, if greater protection is desired, the size of the opening at the top is decreased, for example a door. Product 110 in reusable container 108 within cart 100 can only receive RF transmission from above. Due to non-active device constraints (about 6 inches for NFC and about 6 feet for RFID) the cart in effect makes the RF signals so weak that they cannot function unless an RF transmitter is above or within Faraday shielded cart 100.

Sides 104 of cart 100 are made of an electro-conductive material. The electro-conductive material includes, but is not limited to, fine wire imbedded in plastic or bare wire. Each side must be connected to the next to allow an electrical current to flow the full circumference of the cage. No gaps or open circuits may exist. Optionally, upper edges 111 of shopping cart 100 is surrounded by reflective media 112 depending on the height of scanning zone 106. Scanning zone 106 with customer's mobile device associated with the smart shopping cart is at or above the surface of the smart shopping cart.

Figure 2:
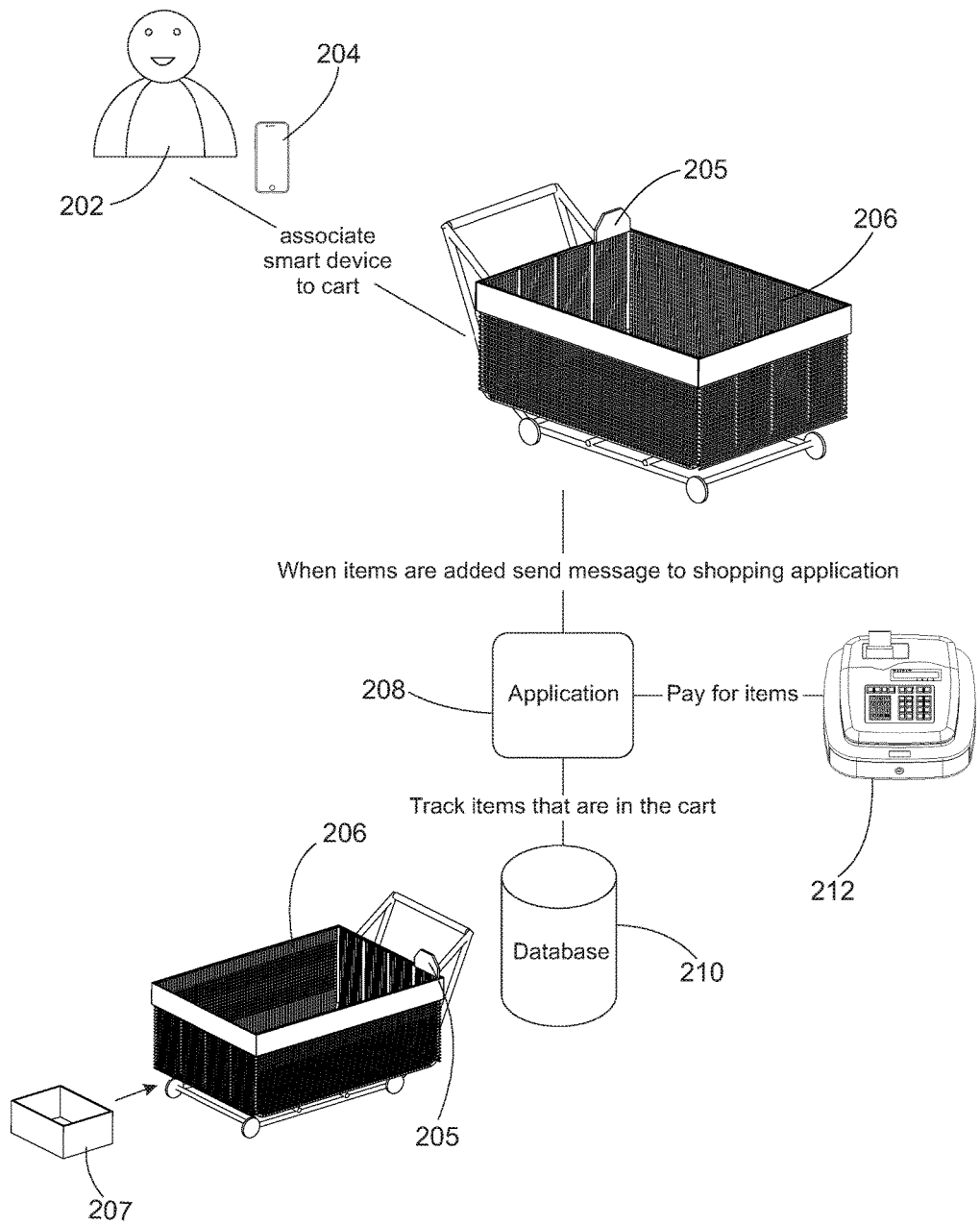
FIG. 2 is an illustrative view of a method of using a smart shopping cart according to the invention.

FIG. 2 illustrates method 200 of using a smart shopping cart. Customer 202 associates mobile device 204 with smart shopping cart 206 having RFID reader 205 and a reusable container 207 to hold items added to smart shopping cart 206. When items are added to smart shopping cart 206 a message is sent to shopping application 208 on mobile device 204. Shopping application 208 tracks items in smart shopping cart 206 and retrieves data as to price from central computer database 210. Customer 202 pays for items via commercial cash register 212 on mobile device 204.

Figure 3:
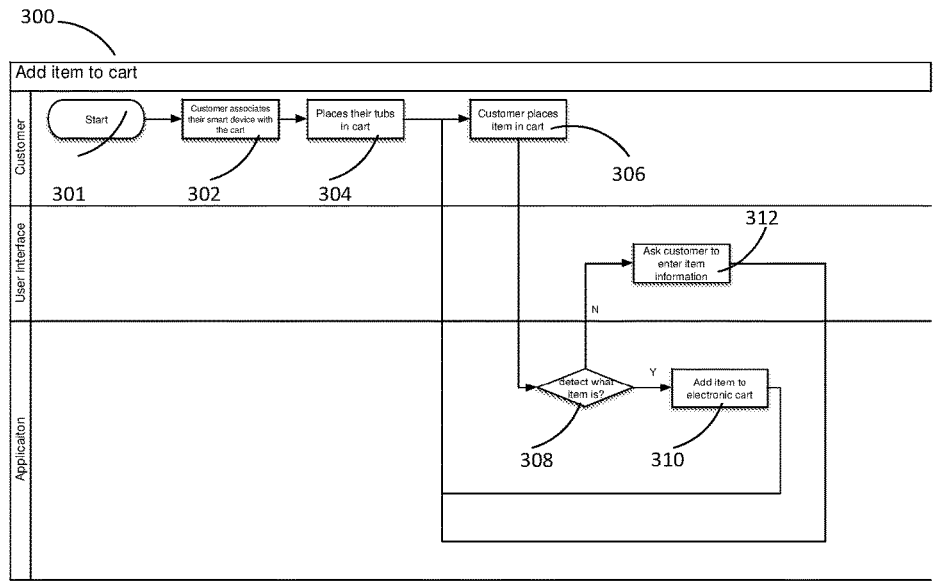
FIG. 3 illustrates a block diagram of a computer system for using a smart shopping cart in a retail store for adding an item to the cart according to the invention.

FIG. 3 illustrates a computer system 300 for adding an item to a smart shopping cart according to the invention. In system 300 for adding an item to a smart shopping cart, customer starts 301 and associates mobile device with their smart shopping cart 302. Customer places containers in their cart 304 and customer places items in the containers in their cart 306. Mobile device/smart shopping cart detects (scans by RFID) what items are placed in the cart 308 and the same items are added to the electronic cart on the mobile device 310. If the items do not scan, the items cannot be added to the electronic cart and customer may enter item information by other means, such as scanning item barcode or entering UPC number to add 312.

Figure 4:
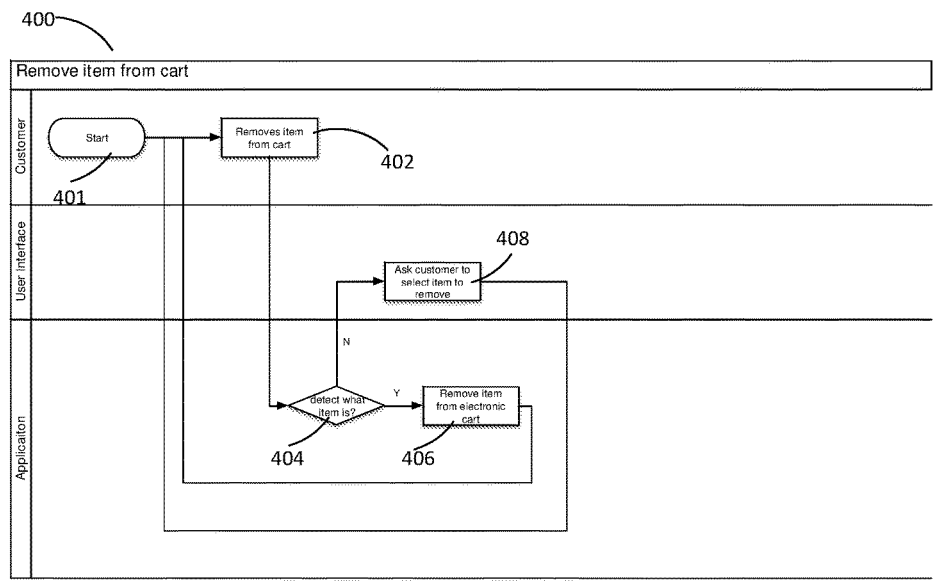
FIG. 4 illustrates a block diagram of a computer system for using a smart shopping cart in a retail store for removing an item from the cart according to the invention.

FIG. 4 illustrates a computer system 400 for removing an item from the smart shopping cart according to the invention. In system 400 for removing an item from a smart shopping cart, customer starts 401 and removes an item from the smart shopping cart 402. The smart shopping cart/mobile device detects (scans by RFID)) what items are removed 404 and the items are removed from the electronic cart on the mobile device 406. If the items do not scan, the items cannot be removed from the electronic cart and customer may enter item information by other means, such as scanning item barcode or entering UPC number to remove 408.

As will be appreciated by one skilled in the art, aspects of the smart shopping cart and method for using the smart shopping cart may be embodied as a system, method, or computer program product. Accordingly, aspects may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wire-line, optical fiber cable, radio frequency, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions.

While the invention has been shown and described with reference to specific preferred embodiments, it should be understood by those skilled in the art that various changes in form and detail may be made therein without departing from the spirit and scope of the invention as defined by the following claims.

What is claimed is:

1. A smart shopping cart comprising:
    a mobile device holder, wherein the mobile device holder comprises a top portion, bottom portion and side portions and wherein the side portions comprise conductive material and the bottom portion is open or comprises non conductive material;
    a removable container in an input zone of the smart shopping cart;
    an RFID reader, wherein the RFID reader detects items being added or removed from the smart shopping cart; and
    a link to an electronic cart on a customer mobile device, wherein the electronic cart is updated as the items are being added or removed from the removeable container in the smart shopping cart and wherein the smart shopping cart is shielded with the conductive material.

2. The smart shopping cart of claim 1, wherein the removable container is a reusable bin.

3. The smart shopping cart of claim 1, wherein the removable container is a reusable bag.

4. The smart shopping cart of claim 1, wherein the smart shopping cart is constructed of a polymer or plastic material impregnated with the conductive material in wire form in a grid pattern.

5. The smart shopping cart of claim 1, wherein the conductive material is mesh.

6. The smart shopping cart of claim 1, wherein the mobile device holder further comprises a reflective portion at an angle extending from the bottom portion.

7. The smart shopping cart of claim 1, wherein the customer mobile device is a cell phone.

8. The smart shopping cart of claim 1, wherein the customer mobile device is a laptop.

9. The smart shopping cart of claim 1, wherein the customer mobile device is the RFID reader.

10. The smart shopping cart of claim 1, further comprising an upper portion of reflective material.

11. A method of using a smart shopping cart comprising:
    placing an item within an input zone of the smart shopping cart, wherein the smart shopping cart comprises a mobile device holder and an RFID, wherein the cart is shielded with conductive material, and wherein the mobile device holder comprises a top portion, bottom portion and side portions and wherein the side portions comprise the conductive material and the bottom portion is open or comprises non conductive material;
    scanning the item in the input zone with a mobile device having an electronic cart or the RFID reader in communication with the mobile device;

placing the item in a removable container in the smart shopping cart, wherein the item is protected from outside RF inspection;

paying for the item in the electronic cart; and removing the removable container from the smart shopping cart.

12. The smart shopping cart of claim 11, wherein the removable container is a reusable bin.

13. The smart shopping cart of claim 11, wherein the removable container is a reusable bag.

14. The smart shopping cart of claim 11, wherein the conductive material is wire embedded in plastic.

15. The smart shopping cart of claim 11, wherein the conductive material is mesh.

16. The smart shopping cart of claim 11, wherein the mobile device holder further comprises a reflective portion at an angle extending from the bottom portion.

17. The smart shopping cart of claim 11, wherein the mobile device is a cell phone.

18. The smart shopping cart of claim 11, wherein the mobile device is a laptop.

* * * * *